July 3, 1962

W. MORRIS 3,042,085

CONDIMENT HOLDER

Filed May 11, 1959

INVENTOR
William Morris
BY Rockwell & Bartholow
ATTORNEYS

July 3, 1962 W. MORRIS 3,042,085
CONDIMENT HOLDER
Filed May 11, 1959 2 Sheets-Sheet 2
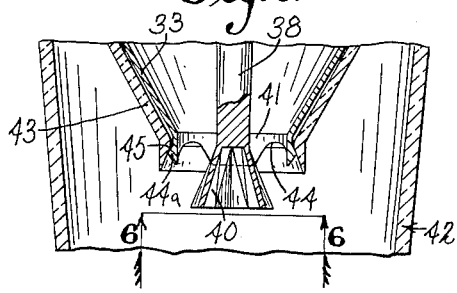
INVENTOR
William Morris
BY Rockwell & Bartholow
ATTORNEYS

United States Patent Office 3,042,085
Patented July 3, 1962

3,042,085
CONDIMENT HOLDER
William Morris, 297 Park St., West Haven, Conn.
Filed May 11, 1959, Ser. No. 812,329
5 Claims. (Cl. 141—353)

This invention relates to a condiment holder, and relates more particularly to a holder, not for table use, but for use in a kitchen, for example, and for use in refilling table condiment shakers and dispensing condiments for cooking purposes. The holder, in effect, forms a reservoir for condiment which may be employed in a kitchen in place of the conventional cylindrical box in which condiment, especially salt, is commonly sold at stores. In other words, a condiment, such as salt, which is usually bought in a relatively large cardboard container, may be emptied from such a container directly into the holder for later use for cooking purposes and for later use in condiment shakers, so that the box in which the salt was sold may be thrown away. While not limited thereto, the holder is especially useful for refilling condiment shakers generally of the type illustrated in my U.S. Letters Patents Nos. 2,694,512 and 2,779,518 and in which the condiment shaker is provided with a dispensing opening and a cooperating plug or valve member supported from a spring secured to the casing of the shaker. The condiment holder is preferably of the type which may be supported from a kitchen wall, for example, for ready access to its contents.

Accordingly, one object of the invention is to provide an improved condiment holder. Further, specific objects of the invention will be apparent from the following detailed description of several forms of the holder illustrated in the drawings by way of example.

In the drawings:

FIG. 5 is a fragmentary view in vertical section further illustrating certain parts shown in FIG. 3, the parts being shown on a larger scale in FIG. 5;

FIG. 6 is a view looking in the direction of the arrows 6—6 of FIG. 5;

FIG. 7 is a view illustrating a dichotomy of a condiment-receiving cup employed with the holder as a part thereof, the cup in one aspect being shown in elevation and partially in section, the cup in the other aspect being shown in top plan;

FIG. 8 is a fragmentary view similar to FIG. 5, illustrating the manner in which a condiment shaker may be refilled from the holder;

FIG. 9 is a fragmentary view illustrating in vertical section a modification of the holder and illustrating the holder without the condiment-receiving cup;

FIG. 10 is a sectional view taken on line 10—10 of FIG. 9;

FIG. 11 is a sectional view similar to FIG. 3 but illustrating a further modification of the holder and illustrating the valve means in the closed position thereof; and FIG. 12 is a sectional view taken on line 12—12 of FIG. 11.

Figure 1:
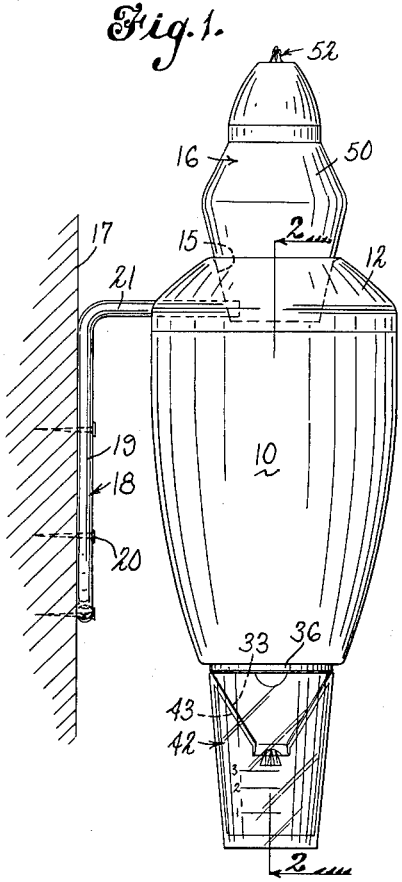
FIG. 1 is a side elevational view of the improved condiment holder showing the same secured to an upstanding wall.
Figure 2:
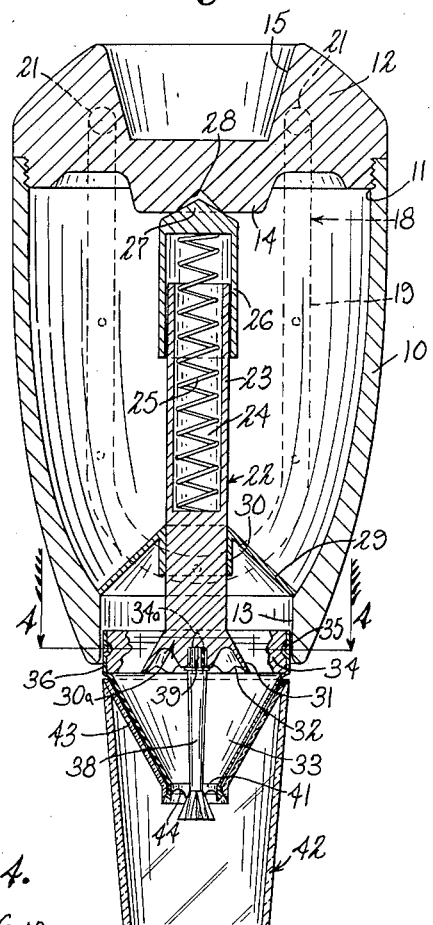
FIG. 2 is an enlarged sectional view taken on line 2—2 of FIG. 1 and illustrating the valve means of the holder in the closed position thereof.
Figure 3:
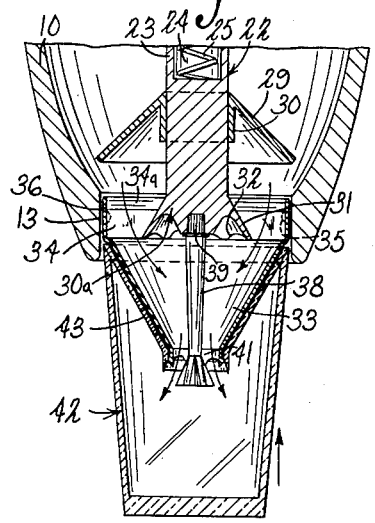
FIG. 3 is a fragmentary sectional view similar to FIG. 2 but illustrating the valve means in the open position thereof.
Figure 4:
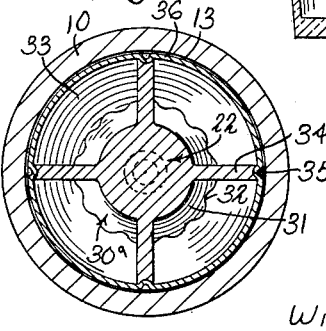
FIG. 4 is a further enlarged sectional view taken on line 4—4 of FIG. 2.

In the form shown in FIGS. 1 through 8 of the drawings, the condiment holder includes a hollow body 10 elongated vertically and somewhat tapered at the lower portion thereof, the body being constructed of plastic, wood or other suitable material. As best shown in FIG. 2, the body 10 is formed with an opening 11 at the upper end thereof and in this region the body is internally threaded to receive a threaded closure cap 12. A somewhat smaller opening 13 is formed in the lower end of the body. As shown in the last-mentioned view, the inner wall surface of the body tapers from the upper end of the body toward the opening 13 which forms an exit for condiment. Also as shown in FIG. 2, the threaded cap 12 may have a depending boss 14, and the cap at its upper surface may be recessed, as at 15, to supportingly receive the lower casing portion of a condiment shaker indicated generally at 16. As shown in FIG. 1, the condiment holder may be supported from an upright wall 17 through a bracket 18 having an operative connection to the cap 12, the arrangement being such that the cap 12 is permanently secured to the wall to provide a fixed support for the shaker 16, the body 10 being removable by unthreading the same from the cap. The bracket 18 may be formed from a bent rod having a U-shaped portion 19 secured to the wall 17 by suitable fasteners 20. At the upper part thereof the bracket 18 may have arms 21 extending laterally from the U-shaped portion 19 and extending outwardly from the wall, the arms 21 having their outer ends suitably secured to the cap 12 as by being imbedded in the material of the cap, for example.

The condiment holder is provided internally with valve means, indicated generally at 22, and comprising a vertically extending valve stem 23 having an axial dead-end bore 24 extending through the upper end thereof to receive a coil spring 25 which bottoms in the dead-end bore and biases the stem in a downward direction. As shown in FIG. 2, a tubular cap 26 extends over the upper end of the stem 23 to house the upper end of the spring 25, the tubular cap 26 and the stem 23 being in sliding and telescoping relation. The upper surface of the tubular cap may be crowned or pointed, as at 27, to be received in a recess 28 in the boss 14 of the outer cap 12 to center the valve stem 23 with respect to the cap 12. At the lower portion thereof the valve stem 23 is provided with an enlargement 29 generally of the form of a truncated cone and tapering outwardly and downwardly. When the valve stem 23 is in its closed position the stem portion 29 engages and is seated against the inner wall surface of the body 10 in the region of the opening 13 to close off the last-mentioned opening. In this position of the valve stem the peripheral edge of the portion 29 has substantially flatwise engagement with the tapered inner surface of the body of the holder, as shown in FIG. 2, and, as shown in the last-mentioned view, the stem portion 29 may be formed as a separate piece which may be constructed of plastic or non-corrosive metal. The last-named portion of the stem is tapered to facilitate the flow of condiment in a direction outwardly from the axis of the valve stem and toward the surface defining the exit opening 13 and, as shown in FIG. 2, the stem portion or part 29 may be of shell form having an internal central sleeve 30 suitably secured on the stem 23 in axially fixed relation thereto.

The valve stem 23 extends below the part 29 and directly below the latter is of substantially the same diameter as the diameter of the stem portion above the enlargement or part 29. However, at the lower extremity thereof the valve stem 23 is provided with another enlargement, indicated generally at 30$^a$, having a baffle part 31 of smaller diameter than the enlargement 29. The baffle part 31, formed integrally with the valve stem 23, is tapered outwardly and downwardly, as shown in FIG. 2. When the valve stem 23 is in the closed position of FIG. 2, the baffle part 31 extends below the lower extremity of the holder body. However, when the valve stem is in the open position shown in FIG. 3, the baffle part is withdrawn to some extent into the body so that it occupies a position in the condiment exit 13. As shown in the last-mentioned view, the baffle part has a serrated edge 32 to facilitate the flow and distribution of condiment past the part 31 when the valve stem is in open position.

A funnel 33 is supported in the exit opening 13. To support the funnel 33 in fixed relation thereto, the enlargement 30$^a$ of the stem is provided with a plurality of integral spokes 34 extending radially outward from the baffle part 31 and each having at its distal end a recess to receive one of a number of beads 35 provided on the rim portion 36 of the funnel. The funnel 33 is preferably formed of non-corrosive metal or plastic, such as nylon. The rim portion 36 of the funnel (see FIG. 2) is of a diameter only slightly less than the diameter of the exit opening 13 but does not bind therein so that, while the rim portion may move up and down in the opening 13 through movement of the valve stem, the passage of condiment between the holder body and the outer surface of the rim portion 36 is effectively inhibited. The upper surfaces (see FIG. 3) of the spokes 34 may be tapered, as at 34$^a$, to obstruct as little as possible the flow of condiment into the funnel 33.

At the lower extremity thereof, the valve stem 23 is provided with an axially disposed pin 38 which extends through the funnel. The upper end of the pin 38 may be splined, as at 39, and may be driven tightly into a bore in the stem for rigid support by the stem. As best shown in FIG. 5, the lower end of the pin 38 is flared outwardly and provided with a downwardly facing nonround (FIG. 6) recess 40. As shown in FIGS. 5 and 6, the lower flared end of the pin is fluted and, as also shown in FIG. 5, the fluted end of the pin is disposed partly in the funnel exit 41 and extends somewhat below the last-mentioned exit. The condiment-receiving cup, indicated generally at 42, cooperates with the funnel 33. The cup 42, which may be formed of plastic or other material but which is preferably graduated as shown in FIG. 1 and preferably formed of transparent material, has an integral funnel-like part 43 extending downwardly in the cup from the rim portion thereof and of a size and shape rather closely corresponding with the size and shape of the funnel 33, so that the latter may seat in the part 43 when the condiment-receiving cup is attached to the condiment holder.

The cup 42 may be removably supported from the holder by the funnel 33 and for this purpose the lower extremity of the funnel 33 (see FIG. 5) may be beaded, as at 44$^a$, to extend under and engage a shoulder 45 formed at the lower extremity of the funnel-like part 43. The lower beaded edge of the funnel 33 may be broken or serrated, as at 44, to provide the edge with sufficient compressibility that it may snap in and out of the shouldered lower extremity of the funnel-like part 43. Thus the condiment-receiving cup 42 may be supported from the funnel 33 through the lower extremity of the funnel-like part 43 of the cup. This permits a very satisfactory connection to support the weight of the cup 42 even when the cup is filled with condiment to the highest graduated level. The cup 42 may be removed from the condiment holder by grasping the cup with the fingers and pulling it downwardly when the valve means 22 is closed. As previously indicated, the beaded lower end of the funnel 33 may snap out from under the shoulder of the cup. It may be noted that, due in part to the relatively large size of the exit opening 13 in the holder body and the relatively small dimensions of the funnel 33, the funnel may be filled on only a momentary opening of the valve means. It will be understood that condiment in the funnel 33 may drain readily into the bottom of the cup 42 irrespective of whether or not the valve means is open.

The condiment-receiving cup 42, best shown in FIG. 7, may be used to pour out a relatively large quantity of condiment for cooking purposes or may be used instead as a supplemental condiment shaker. To this end the cup 42 may have a fairly broad aperture 46 formed in the funnel-like part 43 adjacent the rim of the cup and at one side thereof. It will be understood that condiment in fairly large quantities may be poured through the last-mentioned aperture. At the other side of the cup the funnel-like part 43 is provided with a plurality of elliptical and smaller holes 47 spaced from one another, and at the last-mentioned side of the cup the part 43 is provided with a plurality of holes 48 similar to the holes 47 but of larger size, the holes 48 being spaced apart along a portion of the funnel-like part 43 adjacent the rim of the cup. As shown in FIG. 7, the apertures or holes 47 are nearer the center of the cup than the holes 48. It will be manifest from the foregoing that when the cup 42 is shaken and held in the hand in partly inverted position with the dispensing openings 47, 48 lowermost a relatively small and widely distributed supply of condiment may be obtained from the cup. It will also be obvious from the foregoing that salt or another condiment may be poured in a steady and fairly heavy stream from the dispensing opening 46 in the cup when the cup is held in the hand in partly inverted position with the last-mentioned opening lowermost.

The operation of the condiment holder to dispense condiment to the condiment-receiving cup or to fill a condiment shaker is as follows. To supply condiment from the holder body to the condiment-receiving cup 42, the cup, which may have been previously removed from the funnel 33 of the holder, is thrust upwardly against the bottom of the funnel to move the valve stem upwardly in the body or casing against the pressure of the spring 25, thereby moving the orifice-sealing part 29 of the valve means upwardly out of sealing engagement with the casing, to permit condiment to flow downwardly past the part 29 and past the baffle part 31 into the funnel 33 and then around the flared lower end of the pin 38 into the cup 42. It will be understood that, in effect, the enlargement 29 of the stem, the enlargement 30$^a$ of the stem, the funnel 33 and the pin 38 provide, together, a valve head which, when pressed upwardly by the cup 42 results in the flow of condiment downwardly through the condiment exit 13 and into the cup through the part of the valve head formed by the funnel 33.

As indicated above, the condiment holder may be employed to refill the condiment shaker 16 which, as previously pointed out, may be generally of the type illustrated in my U.S. Letters Patents Nos. 2,694,512 and 2,779,518. The shaker 16 includes an upright casing 50 having a dispensing opening 51 in the top thereof. A plug or valve member 52 cooperates with the opening 51 and in one adjusted position the member 52 may seal the opening. The valve member 52 is adjustably supported on a coil spring 53 having one terminal thereof rigidly supported within the upper part of the casing, as at 53$^a$, and having the other end thereof threaded into the member 52, as at 54. To vary the effective size of the dispensing opening the valve member 52 may be either threadedly adjusted on the spring 53 or depressed manually against the force of the spring 53.

When it is desired to refill the shaker 16 the positions of the shaker 16 and the condiment-receiving cup 42 may be switched. When the valve member 52 is closed or partially open or, for that matter, fully open, the shaker may be thrust upwardly against the funnel 33. The bead 44$^a$ of the funnel may snap into the dispensing opening 51 of the shaker to support the shaker. As the shaker is thrust against the condiment holder the fluted and cupped end 40 of the pin 38 receives and engages the correspondingly formed upper surface 52$^a$ of the valve member 52 to depress and fully open the valve member 52, if not fully open initially. When the fluted and cupped end 40 of the pin engages the upper surface of the plug member the plug member may be threadedly adjusted with respect to the dispensing opening 51 by rotating the casing 50 of the shaker with the fingers. This adjustment is not necessary to fill the shaker, however. Upward movement of the shaker 16 against the condiment holder serves to open the valve means 22 of the holder through engagement and upward movement of the funnel 33. As previously indicated, the valve means of the holder need be open only a very short time to fill the funnel 33, and the volume of the funnel may be sufficient to fill the shaker to the desired level. After the valve means 22 has been opened to fill the funnel the shaker may be released by the user's fingers so that the valve head including the part 29 may move to its closed position, carrying the shaker with it, through the action of the spring 25. After the valve means 22 is closed any condiment left in the funnel may drain into the shaker. When desired, the shaker may be pulled off the funnel 33 in much the same manner as the cup 42 described above. It will be understood that the bead 44ª of the funnel supports the shaker 16 until such time as the shaker is grasped and pulled off. When the shaker is pulled off, the valve member 52 of the shaker, if not fully open initially, is returned to its initial position by the spring 53. It will be obvious from the foregoing that receptacles other than the cup 42 and the shaker 16 may be filled from the condiment holder. For example, with the cup 42 removed from the holder, a suitable receptacle may be held under the funnel and the funnel raised with the fingers, thereby permitting condiment to flow into the receptacle.

The form of the condiment holder shown in FIGS. 9 and 10 is identical to the form of FIGS. 1 through 8 except for the connection of the funnel to the valve stem. As shown in FIG. 9, the funnel 33ª, similar to the funnel 33 described above but having an externally threaded rim portion 56, is supported from a ring 57 threaded internally to receive the funnel rim. The ring 57 is supported by spokes 34ª radiating outwardly from a baffle part 31ª, similar to the baffle part 31 described above. The spokes 34ª may be formed integrally with both the baffle part 31ª and the ring 57. It will be manifest that the ring 57 supports the funnel 33ª around its entire circumference. Furthermore, the ring may be separated from the funnel by merely unthreading the latter.

The modified form of the condiment holder shown in FIGS. 11 and 12 is without some of the advantages of the illustrated forms of the invention previously described. The form of FIGS. 11 and 12, only generally similar to the form of FIGS. 1 through 8, differs from the last-mentioned form in the construction of the valve head and the condiment-receiving cup but in all other respects is identical. In the form of FIGS. 11 and 12 the valve stem 60 has as an integral part thereof a tapered enlargement 61 for cooperation with the condiment exit 13 of the casing. The tapered enlargement may be hollowed out, as at 62. As shown in FIG. 11, the enlargement 61 is provided with a circumferential shoulder 63 to be seated against the casing in the region of the condiment exit when the valve stem is in its closed position. Below the circumferential shoulder 63 and in depending relation to the orifice-sealing enlargement 61 are a plurality of circumferentially spaced lugs 64, each having threads formed on the lower outer face thereof to cooperate with internal threads of the condiment-receiving cup.

The condiment-receiving cup, indicated generally at 66, may be identical to the condiment-receiving cup 42, described above, except for the fact that the cup 66 has a rim portion 67 extending above the funnel-like part 43. It is this rim portion which is provided with the aforementioned internal threads, indicated at 67ª, to cooperate with the threaded lugs 64. It will be manifest from the foregoing that the condiment-receiving cup 66 may be threaded on and off the valve head provided by the enlargement 61 of the stem 60. As shown in FIG. 11, the rim portion 67 of the cup, which is movable up and down in the condiment exit 13 with the valve head, is of a diameter to fit within the opening 13 with little clearance to prevent the flow of condiment between the casing and the external surface of the condiment-receiving cup. The operation of the condiment holder of FIGS. 11 and 12 will be manifest from the foregoing description of its construction. To obtain condiment in the cup 66, the cup, which may have been disconnected previously from the holder, is threaded on the lugs 64 of the valve head. The cup is then pressed upwardly with the fingers to move the valve head upwardly in the casing and permit condiment in the casing to flow around the enlargement 61 and between the lugs 64. It will be evident that condiment flowing between the lugs 64 passes into the funnel-like part 43 of the cup and then falls by gravity into the bottom of the cup. It will be observed that the form of FIGS. 11 and 12 omits the funnel in the lower extremity of the valve head and also omits the axially disposed pin on the lower extremity of the valve stem.

It will be evident that, in accordance with the foregoing disclosure, there is provided a condiment holder especially suited for use in refilling table condiment shakers and for dispensing condiments for cooking purposes, the holder forming, in effect, a reservoir for condiment which may be supported on a kitchen wall, if desired. It will also be understood from the foregoing disclosure that the condiment holder takes the place of the usual cardboard box in which condiment, especially salt, is usually stored after its purchase at a store. The condiment-receiving cup of the holder provides a very useful supplementary condiment shaker from which condiment may be either shaken lightly or poured in a fairly heavy stream. Furthermore, the pin of the holder, provided on the lower extremity of the valve stem, provides means for threadedly adjusting the valve or plug member of the table shaker which may be supported on the top of the holder. It will also be apparent from the foregoing that the condiment holder, which may be of pleasing appearance, is constructed of relatively few and simple parts and will not readily get out of order.

While several forms of the condiment holder have been illustrated in the drawings and described above, it will be readily apparent to those versed in the art that the condiment holder may take other forms and is susceptible of various modifications and changes in details without departing from the principles of the invention and the scope of the appended claims.

What I claim is:

1. In a dispenser for holding a material to be dispensed such as a condiment, an upright casing having an opening in the bottom thereof and provided internally with means defining a valve seat adjacent and above the opening, the casing being provided with an imperforate closure cap at the upper part thereof, an upwardly arranged valve stem movable vertically in the casing, means engageable with the stem and said closure and biasing the stem downwardly toward the closed position thereof and cooperating with the closure to tend to maintain the stem in concentric relation to said opening, the last-named means including a tubular upwardly biased cap in telescoping relation to the stem and having a part cooperating with a boss on the first-mentioned cap having a recess providing a seat for said tubular cap, an orifice-sealing member on the lower part of the stem in fixed relation thereto and for cooperation with the valve seat, a material-receiving cup for support from the valve stem and extending upwardly into said opening in the casing below the valve seat, and means below the orifice-sealing member and fixed thereto and having a releasable connection to the cup, the last-named means supporting the cup in said opening so that the cup may be filled with material when the cup is pressed upwardly to unseat the orifice-sealing member.

2. In a dispenser for holding a material to be dispensed such as a condiment, an upright casing having an opening in the bottom thereof and provided internally with means defining a valve seat adjacent and above the opening, the casing being provided with a closure at the upper part thereof, an upwardly arranged valve stem movable vertically in the casing and provided with means cooperating with the casing to bias the stem downwardly toward the closed position thereof, an orifice-sealing member on the lower part of the stem in fixed relation thereto and for cooperation with the valve seat, a condiment-receiving cup for support from the valve stem and to extend upwardly into said opening in the casing below the valve seat, and a funnel extending downwardly into the material-receiving cup and mounted in fixed relation to the orifice-sealing member, the cup having a funnel-like part providing a seat for said funnel, the latter having at its lower extremity a releasable connection with said funnel-like part to support the cup from the valve stem.

3. In a dispenser for holding material to be dispensed such as a condiment, an upright casing having an opening in the bottom thereof and provided internally with means defining a valve seat adjacent and above the opening, the casing being provided with a closure at the upper part thereof, an upwardly arranged valve stem movable vertically in the casing and provided with means cooperating with the casing to bias the stem downwardly toward the closed position thereof, an orifice-sealing member on the lower part of the stem in fixed relation thereto and for cooperation with the valve seat, said member being of shell form and tapering downwardly and outwardly in a direction away from the vertical axis of the casing, the valve stem having below the orifice-sealing member an outwardly and downwardly inclined baffle part and a plurality of spokes radiating from the valve stem adjacent the baffle part, a downwardly extending funnel having the rim portion thereof supported from said spokes, and a pin carried by the lower extremity of the valve stem in axial relation thereto and extending through the funnel exit, the orifice-sealing member being unseated upon upward pressure on the valve stem and the pin being operative to depress and open a spring-supported valve member of a condiment shaker.

4. In a dispenser for holding a material to be dispensed such as a condiment, an upright casing having an opening in the bottom thereof and provided internally with means defining a valve seat adjacent and above the opening, the casing being provided at its upper end with a removable imperforate cap, an upwardly arranged valve means movable vertically in the casing and including a valve stem portion, means interposed between said stem portion and the cap biasing the stem portion downwardly toward the closed position thereof and cooperating with the cap to tend to maintain the stem in concentric relation to said opening, the last-named means including a tubular cap part embracing said stem portion and upwardly biased in telescoping relation thereto, said cap part having a tapered upper surface cooperating with a boss on said closure cap, said valve means including an orifice-sealing member on the lower part of the stem portion in fixed relation thereto for cooperation with the valve seat, said valve means including a downwardly projecting stem member below said orifice-sealing member in fixed relation to said stem portion and having at the lower end thereof a baffle part, and the stem member having a plurality of spokes radiating therefrom adjacent the baffle part and supporting a ring in concentric relation to the stem member, a condiment-receiving cup for support from the valve means and to extend upwardly into said opening in the casing below the valve seat, said ring having means thereon providing a releasable connection to the cup to support the latter, the cup being operative to unseat the orifice-sealing member when the cup is pressed upwardly.

5. In a dispenser for holding a material to be dispensed such as a condiment, an upright casing having an opening in the bottom thereof and provided internally with means defining a valve seat adjacent and above the opening, the casing being provided at its upper end with a removable imperforate cap, an upwardly arranged valve means movable vertically in the casing and including a valve stem portion, means interposed between said stem portion and the cap biasing the stem downwardly toward the closed position thereof and cooperating with the cap to tend to maintain the stem portion in concentric relation to said opening, the last-named means including a tubular cap part embracing said stem portion and upwardly biased in telescoping relation thereto, said cap part having a tapered upper surface cooperating with a boss on said closure cap, said valve means including an orifice-sealing member on the lower part of the stem portion in fixed relation thereto for cooperation with the valve seat, said valve means including a downwardly projecting stem member below said orifice-sealing member in fixed relation to said stem portion and having at the lower end thereof a baffle part, and the stem member having a plurality of spokes radiating therefrom adjacent the baffle part and supporting a ring in concentric relation to the stem member, and said valve means including a funnel supported from the ring in concentric relation to said stem member, a material-receiving cup for support from the valve means and extending upwardly into said casing below the valve seat, the funnel having a releasable connection to the cup to support the latter, and the cup being operative to unseat the orifice-sealing member when the cup is pressed upwardly.

References Cited in the file of this patent

UNITED STATES PATENTS

| 1,327,686 | Rose | Jan. 13, 1920 |
| 2,054,881 | Saunders | Sept. 22, 1936 |
| 2,107,324 | Boyle | Feb. 8, 1938 |
| 2,158,948 | Rubens | May 16, 1939 |
| 2,401,674 | Vizay | June 4, 1946 |